(12) United States Patent
Sorensen et al.

(10) Patent No.: US 6,687,003 B1
(45) Date of Patent: Feb. 3, 2004

(54) METHOD FOR RECORDING AND VIEWING STEREOSCOPIC IMAGES IN COLOR USING MULTICHROME FILTERS

(76) Inventors: Svend Erik Borre Sorensen, Danmarksvej 19, DK-2800, Lyngby (DK); Per Skafte Hansen, Gl. Hareskovvej 305 st., DK-3500, Vaerlose (DK); Nils Lykke Sorensen, Dybbolvej 17, DK-8240, Risskov (DK)

( * ) Notice: Subject to any disclaimer, the term of this patent is extended or adjusted under 35 U.S.C. 154(b) by 0 days.

(21) Appl. No.: 09/807,329
(22) PCT Filed: Oct. 18, 1999
(86) PCT No.: PCT/DK99/00568
§ 371 (c)(1),
(2), (4) Date: May 31, 2001
(87) PCT Pub. No.: WO00/23845
PCT Pub. Date: Apr. 27, 2000

(30) Foreign Application Priority Data

Oct. 20, 1998  (DK) ........................................ 1998 01342

(51) Int. Cl.[7] .................................................. G01J 3/46
(52) U.S. Cl. ........................................ 356/402; 356/405
(58) Field of Search ................................. 356/402, 405; 345/593

(56) References Cited

U.S. PATENT DOCUMENTS

| | | |
|---|---|---|
| 3,712,199 A | 1/1973 | Songer Jr. |
| 4,009,951 A | 3/1977 | Ihms |
| 4,134,644 A | 1/1979 | Marks et al. |
| 4,189,210 A | 2/1980 | Browning et al. |
| 4,247,177 A | 1/1981 | Marks et al. |
| 4,290,675 A | 9/1981 | Beiser |
| 4,620,770 A | 11/1986 | Wexler |
| 5,491,646 A | 2/1996 | Erskine |

*Primary Examiner*—Euncha Cherry
(74) *Attorney, Agent, or Firm*—Birch, Stewart, Kolasch & Birch, LLP

(57) ABSTRACT

The aim of the invention is to create techniques for the encoding, production and viewing of stereograms, supplemented by methods for selecting certain optical filters needed in these novel techniques, thus providing a human observer with stereograms each of which consist of a single image for viewing through special filter pairs, the stereogram encoding essentially the full color information of the original stereogram or of the original scene, while at the same time encoding the full parallactic depth of the original stereogram or the parallactic depth that would normally be found in a conventional stereogram recorded of the scene. The invention makes use of a color-based encoding technique and viewing filters selected so that the human observer receives, in one eye, an image of nearly full color information, in the other eye, an essentially monochrome image supplying the parallactic differences prescribed by the stereoscopic principle and supplementing the color perception. For selecting the filters, the invention suggests an auxiliary test. For encoding the stereograms, the invention suggests a special process of channel separation and replacement. For color correction in the resulting image, the invention suggests a multistage process. Generally speaking, the best results are obtained when all of these are used together.

22 Claims, 18 Drawing Sheets

Figure 1:
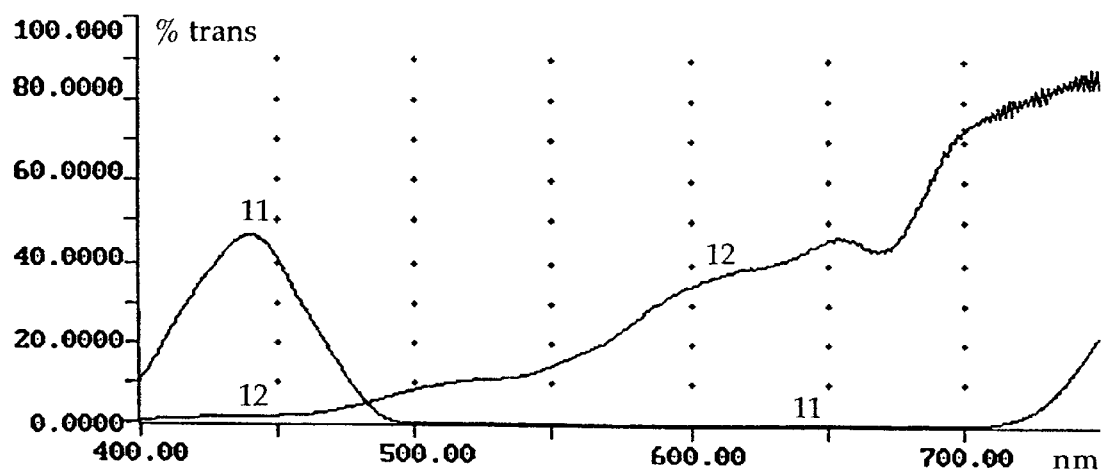

METHOD FOR RECORDING AND VIEWING STEREOSCOPIC IMAGES IN COLOR USING MULTICHROME FILTERS

This application is the national phase under 35 U.S.C. §371 of PCT International Application No. PCT/DK99/00568 which has an International filing date of Oct. 18, 1999, which designated the United States of America and was published in English.

FIELD OF THE INVENTION

The invention represents a novel method for recording and viewing stereoscopic images by making use of a partially separated encoding of the depth information and the colour values.

BACKGROUND OF THE INVENTION

The so-called anaglyph method for recording and viewing stereoscopic images has been known for around a hundred and fifty years. In its most common form, as applied to printed images, two mutually extinguishing filters are placed in front of the viewer's eyes and the stereogram (stereoscopic image pair) to be viewed is printed in two suitably chosen dyes, as two images brought "in register", i.e. overlapping correctly. The filters and the dyes are complementary in the sense that, ideally, graphics printed in the one dye looks black when viewed through one filter and indistinguishable from the neutral background when viewed through the other and vice versa. Thus, the filters in front of the viewer's eyes effectively separate the two image impressions in accordance with the stereoscopic principle.

As described above, the method produces monochrome images; and it is in fact quite common to further confine the applications to line drawings and the like, where only purely black lines and curves on a neutral ("white") background, or vice versa, are used. When either the filters or the dyes or both fail to meet the ideal requirements, a number of problems can arise, the most typical being that of cross-talk or ghosting (a colloquial term implying "ghost imaging"), where one eye receives, in addition to its "own" image, a faint copy of the image meant for the other eye. In severe cases, ghosting can interfere with stereopsis to the point of complete obstruction, especially in prolonged stereo viewing sessions. (The word diplopia, meaning "double vision", is used for this situation; but it must be understood to mean "failure to obtain stereoscopic fusion", rather than "observation of a double image", since the latter can happen in stereoscopy with the perception of parallactic depth still active).

Since its discovery, the anaglyph method has been applied to line graphics, photography, motion pictures, television and computer graphics. Each of these media presents its own version of the problem of non-ideal filters and image colorants.

Quite apart from the efforts towards reducing or eliminating the ghosting in monochrome anaglyphs, several attempts have been made to extend the original method so as to allow it to give the viewer the impression of seeing a stereoscopic colour image.

Like the original anaglyph method these extensions make use of two coloured filters placed in front of the viewer's eyes. Each of the two images forming the stereoscopic pair is again displayed in colours so chosen that, ideally, each eye receives only its corresponding image, thus allowing stereopsis. However, in order that an impression of a coloured stereo image can arise, the images reaching the eyes after passing the filters can no longer appear as black on a neutral background; indeed, taken together (in the appropriate sense), they must contain all or practically all colours present in the original scene.

In the prior art, the filters chosen are approximations to ideal complementary side band filters or to an ideal mid band filter and its complementary, where the "bands" in question are ranges of the visual spectrum. Also, the two images recorded to form the stereogram are obtained essentially by filtering the original stereo pair according to this ideal of complementarity. If this filtering is performed optically, the partial images are typically passed through the same coloured filters as used for the viewing, either during the recording of the scene or as a post-processing of the images before display; if done electronically, the customary approach is to use the typical RGB-representation of the image, letting one image retain only one of these three primaries, the other only the two remaining. Either way, the two colour-filtrated partial images are then fused into a single stereogram. Thus, all colour anaglyph techniques rely on the socalled tri-stimulus hypothesis, central to colour science, that all perceivable colours within a given colour gamut can be synthesized as a weighted sum of three basic colours, negative weights requiring a special interpretation. The tri-stimulus hypothesis is assumed throughout this document, and a few remarks about halftoning, undercolour removal and black generation will be made below.

The fusion of the received colours and the correlation of the colours with the stereo image takes place in the viewer's eye-brain system; and in practice, one of the viewer's eyes will receive a much larger range of hues than the other. In the prior art, it is thus tacitly assumed that the human eye-brain system can synthesize essentially any colour, provided only that one eye receives the partial signal corresponding to the original colour's content of one primary, while the other eye receives the partial signal corresponding to the colour's content of the two other primaries.

Prior art techniques may be seen in U.S. Pat. No. 4,134,644 and U.S. Pat. No. 4,247,177.

In addition to ghosting, colour anaglyphs as produced with the prior art have been encumbered by one or more of the following problems, depending on the combinations of filters and display colours used:

The range or "gamut" of colours actually perceived by the viewer has been significantly reduced relative to that of the original scene recorded in the stereogram.

Some colours actually perceived by the viewer have shown significant chromatic deviations from the original colours in the scene recorded.

The total amount of light passing through the filters has often been significantly smaller than the light that would have reached the viewer's eyes, had no filters been applied; and, more importantly, individual colours or colour ranges have shown different degrees of lightness reduction, leading to lightness imbalances in the perceived colours.

The total amounts of light reaching each of the viewer's eyes have differed significantly, and the difference has not been correlated to luminance differences in the original scene. More precisely: owing to the colour separation, a scene colour may require of the human observer's eye-brain system an averaging of a component of a relatively high lightness seen in one eye as against a component of a relatively low lightness seen in the other. This in itself is a considerable psycho-physical challenge. If two such scene colours of approximately the same original lightness but different hues are adjacent in the image, yet appear as light and dark in opposite eyes, the two resulting averaging processes are in direct opposition.

Some colours perceived by the viewer have exhibited an undue amount of stereoscopic sheen, a characteristic lustre observable in all kinds of stereograms in homologous areas of different colours. (The strength of sheen depends in a complicated way on the original scene colour, on the colour differences between the homologous areas, on the luminance differences of the homologous areas and on the viewer's perception).

The basis of the present invention can be demonstrated by two simple experiments:

1) If a stereogram is ideally colour-separated (by electronic means, as described above) and the resulting partial images are displayed side-by-side for optical fusion, using e.g. a Brewster-type stereoscope—instead of overlapping, for fusion by means of coloured viewing filters—it is easily observed that even in this ideal case, the above-mentioned problems occur, the absolute loss of lightness owing to the absorption in viewing filters excepted, of course. In other words: the human eye-brain system is not fully capable of performing the colour fusion tacitly assumed by the prior art.

2) If, instead, the stereogram is so "colour-separated" that one partial image retains all colours while the other is converted to a gray-scale image, the latter further subjected to some reduction of contrast and luminance, and the resulting images again presented side-by-side and optically fused, a full-colour stereo image is seen with essentially no visual artefacts added.

The present invention therefore in a sense aims at approximating the latter kind of separation, while still using coloured filters for viewing and a colour separation process in the preparation of images for display, as in conventional anaglyph techniques. In doing so, the invention makes use of a novel combination of viewing filter colours and optionally of a novel colour separation process in the recording or fusion and a colour correction process applied to the stereogram prior to display, so as to allow a very wide range of faithfully reproduced colours, some control of the level of light intensity distributed to the viewer's eyes over the range of observable colours, a fair elimination of unwanted sheen and a very low level of observed ghosting.

Since no simple optical filter exists which combines the effects of reducing a coloured image to an essentially monochrome image and allowing some kind of "complementary" filter to show a full colour image, compromises must be sought. Further experiments with side-by-side mounted stereograms help to establish bounds for, among other things, purely stereoscopic cross-talk, colour cross-talk, contrast and luminance reduction in one image, partial colour reduction in one image and even reduction of sharpness in one image. Such experiments and the resulting bounds form the basis of a test for combinations of filter pairs and display primaries which together will allow the novel implementation of colour-coded stereoscopy.

Vocabulary

All conventional information needed about colour science, including standard tables and methods of computation, can be found in good text-books on the subject. (The reader may wish to consult D. L. MacAdam: *Color Measurement*, Springer-Verlag 1985, D. B. Judd & G. Wyszecki: *Color in Business, Science and Industry*, Wiley 1975 and the *Handbook of Kodak Photographic Filters*, Eastman Kodak Company 1990). A shortcut through the theoretical background will be made here by the simple device of a vocabulary, narrowing down the meaning of a number of words as used in this document.

The word colour is used in this document in a number of conceptually slightly different meanings: thus, a dye or colorant, a spectral distribution, a perceived visual attribute that involves a perceived hue etc. all fall under the everyday use of the word "colour"; and where no more specialized term is used in the following, the interpretation will either be obvious from the context or several of the different substitute words will make essentially equal sense, whence the use of a broader term.

For definiteness, it is pointed out that the words monochrome and monochromatic denote the appearance of only one hue, but allow this to be any hue and also allow the full range of saturations from 0% (equivalent to "black") to 100%. When there is no perceivable (nameable) hue in a monochrome image, it is customarily called a gray-scale image. (When an image is truly black-on-white or any other combination of one specific colour on another, it is usually called a "two-tone" image.

A spectrum or spectral distribution is, for definiteness, taken to be a set of pairs of real numbers, (w, s), where w lies in the range [400;7001] and s in the range [0;1]. The number w is taken to represent wavelength in nanometers, and the number s some measure of strength, with "1" representing some kind of maximum, just as often represented by the equivalent "100%". Ideally, a spectral distribution contains exactly one pair for all possible values of w in the range—in other words, it forms a continuum. In practice, as always, the spectrum will be a finite set, and "missing" values must be obtained by some choice of interpolation method. If a light can be produced to match, according to some fixed means of measurement, a given spectral distribution, it will in general give rise to a colour perception in a human spectator. "White" light has an essentially even distribution, i.e. all s-values being essentially the same; but it should be borne in mind that colour adaptation in a human observer allows a wide range of spectral distributions to serve as "whites" and, accordingly, makes colour matching and the mapping from spectral distributions to e g. (R,G,B)-representations depend on the display set-up.

Metamers (or: metameric colours) are colours which arise from different spectral distributions, but are perceived as identical.

A primary or primary colour is a colour in a finite set, the set of primaries, used for specification of other colours. It is customary, and very wise, to select the primaries in such a fashion that their convex combinations (i.e. positively weighted averages) span the largest obtainable area in the planar model of pure hues, the so-called colour gamut of the display at hand. The most common bases are primary sets of red, green and blue (RGB) for additive displays; and cyan, magenta, yellow (CMY) for "subtractive" displays (prints). Note: since the behaviour of additive and subtractive primaries differ in practice—one example is the use of under-colour removal and black generation in prints, leading to the CMYK primary set—all primaries will henceforth be taken as additive, for clarity. When "subtractive" displays are to be dealt with, the primaries discussed in the text are additive colours (i.e. spectral distributions) which have been chosen to represent certain spectral distributions reflected off the display surface. These additive colours are almost invariably taken to be essentially complementary to the "subtractive" primaries.

To avoid confusion, primaries within a given (full) set of primaries are said to be collateral, the word complementary being reserved for its more intuitive meaning as applying to hues, spectral distributions, value sets etc. In colour theory based on the CIE chromaticity diagram, the word complementary can be given a precise meaning when applied to spectral colours; but usually, the intuitive meaning suffices.

A colour attribute is here an attribute of a colour, rather than of an object. Although perceived colours are the results of purely mental activities in the human observer and perceived colour attributes in that sense independent of the original cause of the colour signal, the names and characteristics of colour attributes (e.g. "red content", "saturation", "shade") usually make sense only within a specific colour representation scheme.

A filter is a means of changing the colour attributes of a given (range of) colour(s). It will be assumed that the effect of any filter can be prescribed as a mapping from S to itself, where S denotes the set of all spectral distributions of relevance in the context. The absorption of coloured optical filters is thus modelled by the spectral distribution obtained when white light is passed through them.

An ideal filter is a filter which acts on all spectral distributions with mathematical exactness in accordance with its definition. An approximate filter acts in accordance with its definition to within an error margin which may be explicitly stated or implicit in the description. Real-life transmission or reflection filters are approximate, filters in mathematical models or in computations acting on integers are ideal. The word filter alone will cover both meanings, but is usually intended to signify an approximate filter.

A subtractive filter acts on a given spectral distribution by replacing every s-value in the distribution by a value which is not larger than the original. An additive filter may replace some s-values in a spectral distribution by a higher value. The meaning of the words subtractive and additive as applied to filters should not be confused with the commonly used meaning, describing two modes of colour blending, namely "paint mixing", which is subtractive insofar as it is absorptive, and "light mixing". Also, note: additive filtering can not be achieved optically, since all optical filters absorb a certain amount of the light passing through them. It can be emulated optically by the combined use of a subtractive filter and increased light intensity; and it can be achieved computationally, in a model of the filtering process.

Given the spectral distributions of a set of primaries and a chosen primary from the set, an associated 1-primary filter is a filter which reduces any s-value in an arbitrary spectral distribution to at most the corresponding s-value of the primary. A 2-primary filter reduces all s-values of an arbitrary spectral distribution to at most the highest of the corresponding s-values of two given primaries.

To make certain descriptions in the following short and clear, let a 0-primary filter be a filter which reduces all s-values to their luminance content according to a chosen luminance measure, optionally scaled by a common factor. Optically, such a filter can only be approximated, although its effect can be emulated almost to perfection by photographic means. Electronically and computationally, a 0-primary filter can be realized to the accuracy allowed by the electronic equipment and the computational representation, respectively.

For completeness, a 3-primary filter is a filter with no effect other than a possible scaling by a common factor on the (relative) spectral distribution of any colour. Here, the tri-stimulus hypothesis is clearly at work, but the phrase "3-primary filter" should not be taken to imply that the full set of primaries has exactly 3 members, although this will be the case in most practical applications.

A combination (of) filter(s) is a filter with the combined effect of two or more filters. In computational emulation of filters, the combined effect is often modelled using a pointwise product.

A null filter excludes all visible light, i.e. regardless of the spectral distribution, all s-values are set to zero by a null filter.

A neutral density filter has the same relative effect on all s-values in a spectral distribution. This definition makes the phrases "neutral density filter" and 3-primary filter synonymous.

A (ideal) partitioning filter set is here meant to be a filter set (usually a pair) so specified, that: 1) any combination of a pair of different filters from the set is a null filter; and 2) to any (w, s)-pair, a filter in the set can be found which has no effect, or the same effect as a neutral density filter, on the given (w, s)-pair.

A (1,2)-partitioning filter pair is here meant to be a partitioning filter set consisting of two filters, so adapted to a pre-selected set of primaries that one filter (the "1-primary filter" or "1-filter") acts towards one primary as if no filter, or a neutral density filter, was applied, the other (the "2-primary filter" or "2-filter") acts towards the remaining primaries as if no filter, or a neutral density filter, was applied. By their partitioning property, the 1-filter will, generally speaking, exclude light from the two collateral primaries and vice versa, although if the primaries are determined by colour matching, the effect of metamerism may make this relation much more complicated.

A leaky (1,2)-partitioning filter pair is here meant to be an approximate (1,2)-partitioning filter pair in which the 1-filter approximates the ideal, i.e. as far as possible allows passage of all light stemming from one primary and of none from the two remaining primaries; while the 2-filter allows passage of a certain amount (the leak) of light from the one primary and as far as possible all light from the remaining two primaries.

The stereoscopic principle as applied to the recording and stereoscopic display of a stereogram showing a 3-dimensional scene is assumed familiar. It is worth mentioning that a conventional side-by-side or two-channel stereogram consists of two images, called "partial images" in the following (although they are usually only "partial" when considered parts of the stereogram); and that two points, one from each partial image, both being images of the same point in the 3-dimensional scene, are said to be homologous. In side-by-side stereoscopy, the fusion is usually performed by means of prismatic lenses. More generally, two-channel stereoscopy keeps the partial images separate in the display device, but perform a fusion into one image seen by the human observer.

The general nature of the invention can be stated using some of the definitions given above.

The present inventors have identified the problems of the prior art of colour anaglyphs to arise from two distinct but connected sources:

In the prior art, the use of partitioning viewing filter pairs typically makes it difficult for the human spectator's eye-brain system to synthesize a full colour gamut. Therefore, the viewing filter pair must be a suitably chosen leaky (1,2)-partitoning pair, where it turns out that the allowable leak is of a special nature and that certain parameters, characteristic of such a filter pair, lie in a narrow range. The special recording, separation and display techniques required to allow the use of such filters will henceforth be called colour coded stereoscopy.

In the prior art, the deviations of perceived colours from intended or recorded colours fall in separately identifiable, but not mutually exclusive, categories. All categories can be addressed; but it should be noted that conventional colour management techniques serve as intermediates between recorded and displayed colours, and do not address the special anomalies of the final, perceived colours in a colour anaglyph or a colour coded stereogram. Therefore, the colour correction to be performed (often as a post-processing) on a colour anaglyph or a colour coded stereogram can advantageously make use of special adaptations of colour management techniques. This kind of processing, applied during or after the recording of a colour coded stereogram, will be called colour correction.

Since the problems of choice of filters and of colour correction (for each and all of the categories of colour deviations) are interconnected, the various aspects of the invention address these problems as a whole, where possible, but otherwise from whatever angle an improvement is feasible, given that not all parameters are variable in all practical circumstances.

DETAILED DESCRIPTION OF THE INVENTION

The detailed description of the invention falls naturally in three parts: a description of the method of choosing filter pairs, including a qualitative description of some of the specific filter pairs that appear in the embodiments and the claims; a description of the choices of methods for obtaining a colour coded stereogram or, in the case of two-channel imaging, approximating colour coding by novel separation techniques; and a description of the colour management techniques which are preferably applied to identify and adjust the problematic colour ranges described by the invention in order to mitigate their effects on the final perceived colour coded stereogram.

Viewing Filters

For most display purposes, colour mixing is additive and the primaries accordingly red, green and blue (R, G and B). For printing, colour mixture is essentially subtractive (see below) and the primaries used are therefore cyan, magenta and yellow (C, M and Y), with black added for practical purposes. In specification of filters for colour coded stereograms, the 1-primary must be taken from the (R,G,B)-set, since the colour mixture is eventually based on light reaching the observer's eyes and therefore essentially additive. Addition of equal amounts of the two collateral primaries produce the complementary "subtractive" primary. A simple notation for the basic colours of the (1,2)-partitioning filter pairs is therefore (R,C), (G,M) and (B,Y).

It should be noted that the visual appearance of the filters actually used may not correspond to the naive interpretations of these letters. In particular, some C-filters will appear "blue" to most observers and some Y-filters "orange" or even "brown", and these are not normally considered as primary colours.

Even the choice of basic colours of the (1,2)-partitioning filter pair depends on the intended use, a rule of thumb being as follows: (B,Y)-filters generally approximate the ideal (0,3)-partitioning best in the sense that Y-filters let through a wide range of (perceived) colours and B-filters give a nearly monochrome reduced-contrast image. Also, (B,Y)-filters are relatively robust to variations in filter production quality and in display conditions. However, (B,Y)-filters may require a strong colour adjustment; and they often give a substantial lightness imbalance between the images reaching the observer's eyes. (R,C)-filters usually require less colour adjustment and have a better lightness balance, but are more sensitive to variations in display "temperature" (the equivalent black-body temperature of displayed "white"). (G,M)-filters generally have the best lightness balance and in principle require the least colour adjustment; but they give rise to a noticeable sheen ranging over almost all perceivable hues. Also, the fact that the human eye-brain system has its highest resolution in the hue area of green seems to make (G,M)-filtration very sensitive to errors or deviations. Clearly, the importance of each of these various phenomena varies with e.g. the basic colour temperature of the display medium, ambient light in the display set-up, duration and intensity of observation, colour range in images displayed etc., etc. The invention allows the best possible compromise to be sought.

The process of finding a suitable filter pair can be wholly experimental, wholly computational, or a mixture, and can be iterated towards a final optimum as many times as desired; but the following test excludes all irrelevant filter combinations in a very simple fashion:

Assume a candidate filter pair is to be tested. Call the filters "the 1-filter" and "the 2-filter" as described above. With the usual tri-stimulus primaries (R,G,B), one of the partitions R vs. G-and-B, or G vs. B-and-R, or B vs. R-and-G would then be tested. More generally, assume the display primary set P is given and partitioned into two disjoint sets I and II, i.e. P=I+II and I and II have no common member. An additive display device is then chosen, essentially identical to the intended final device. If the final display is subtractive (e.g., graphical or photographic prints), the colours intended as additive display primaries are chosen, the spectral properties of their printed equivalents may be measured, and the test carried out using an additive display device and additive primaries having been chosen to represent their printed counterparts. The major reasons for this circumspect approach are two: the viewing filters will eventually act on light that reaches the observer's eyes; and the complications of printing, especially half tone printing, makes it difficult to assign a single spectral distribution to a printed display colour, even when the light and printing base are known.

Let the phrase "measuring the y-value" be a shorthand notation for "measuring the spectral distribution and computing the y-value according to the 1931 CIE colour matching specification". This can be done in a standardized fashion. Then the test consists of:

Step 1: Display a uniformly coloured image in the most luminous colour (usually "white") available on the display device, when using the full set of primaries chosen. Measure the y-value of this image as seen through the 2-filter and call the result Lu.

Step 2: Similarly, display the most luminous colour available on the display device when using colours from the I-set. Measure the y-value of this image as seen through the 1-filter and call the result L11.

Step 3: Measure the y-value of the image from step 2 as seen through the 2-filter and call the result L12.

Step 4: Again similarly to step 1, display the most luminous colour available on the display device when using the II-set. Measure the y-value of this image as seen through the 1-filter and call the result L21.

Step 5: Measure the y-value of the image from step 4 as seen through the 2-filter and call the result L22.

Step 6: Compute the numbers R1=L21/L11, R21=L21/Lu, R2=L12/L22. Call the numbers R1, R21 and R2 the result of the test.

A few brief comments are necessary at this point:

The number R2 essentially measures the leak and hence the possibility of observing the full colour gamut in the stereogram. The number R21 measures the ability of the 1-filter to exclude the primaries belonging to the complementary image. Hence, R21 is a measure of the visibility of the 1-image over any "ghost" of the 2-image seen through the 1-filter. The bound on R21 given below is fairly tight and in a sense expresses the monochromaticity of the 1-image. The number R1 measures the visibility of the image seen through the 1-filter over and above any ghosting. The test thus offers measures of stereoscopic cross talk and colour leakage that will indicate whether and to what extent colour coded stereoscopy can be obtained. To be useful for viewing colour coded stereograms, a viewing filter pair will generally, according to the invention, have to meet the following conditions:

Condition 1: $R2 \geq 0.005$

Condition 2: $R21 \leq 0.01$

Condition 3: $R1 \leq 0.05$

Note 1: Strictly speaking, there should be an upper bound on R2, expressing the "no cross talk" upper limit; but this is a general stereoscopic condition, rather than a condition associated with the stereoscopic encoding method of the invention.

Note 2: A viewing filter pair that performs well with one set of primaries may perform badly with another and even fail to pass the above test, often a consequence of differing display device "colour temperatures"; and a filter pair that passes the test with good result numbers may still require a more substantial colour correction and hence be less useful than a filter pair that barely makes it. For some purposes, the requirements on R2 may actually be stronger than the limit stated above.

Note 3: In some embodiments of the invention, use is made of separation filters placed before the partial images in a two-channel set-up, as an emulation of colour coding proper. The test then requires that the primaries be selected and passed through the appropriate separation filters before the y-measurements. The reason for this is that the test monitors the behaviour of the viewing filters vis-a-vis the displayed spectral distributions.

Image Separation

Image separation in the prior art has usually been straightforward: one "colour plane" or "colour channel" was removed from one of the partial images of the stereogram and replaced by the corresponding colour plane from the other partial image. This gives essentially the right colours in the anaglyph as seen without filters and may also give the correct stereoscopic effect as seen through the filters. However, as noted above, the perceived colours in the stereogram will fail when conventional viewing filters are applied. Moreover, the stereoscopic effect will suffer under subtler conditions: consider e.g. the use of a (B,Y)-viewing filter pair and a stereogram showing a red flower on a background of green foliage. The actual graphical content of the blue planes of the partial images of the stereogram will be confined to highlights in the picture, which means that conventional anaglyph separation leaves one partial image almost black. As seen through the viewing filters, therefore, the final image may have very little observable depth information.

On the other hand, using the conventional gray scale image corresponding to one partial image to replace the blue plane of the other (e.g. electronically by treating the gray scale image as one colour plane, possibly by converting it to "full colour representation" and taking out the blue plane) will grossly deform the observable hue circle, although on the average an equal number of hues will receive too little or too much blue.

The ideal is still to approximate a (0,3)-representation, and therefore the image separation should use a weighted average somewhere between the two extremes. In the (B,Y)-case, using the blue plane alone corresponds to using the weights (0,0,1) applied to the (R,G,B)-primaries, while the grays are typically given by the NTSC-luminance weights (0.3, 0.59, 0.11). Possible alternatives in the (B,Y)-case would be (0.11, 0.22, 0.67) or (0.17, 0.17, 0.66), giving natural looking blue colours (as seen without filters as well as through the filters) except in isolated "deep blue" areas, yet salvaging depth information from the other two colour planes. Note, that this kind of image separation has part of the colour correction built into it.

The "full colour" image to be seen through the leaky 2-filter may keep as large an amount of its third colour as is commensurate with the cross-talk limits used in the test. Alternatively, all of the third colour is removed and spot colour correction performed after image fusion. For the best overall result, colour correction as described in the next section is recommended.

In a related, but different technique, these essentially one-channel images are shown on two-channel displays, for instance by means of a conventional stereo projector or two standard projectors producing overlaid images on a screen. Then the colour separation can be performed optically as part of the display process, and colour separation filters can be used, which give related weights to the primaries, although an optical filter can not shift luminous energy from one spectral range to another. The colour separation filters must be chosen with the spectral properties of the display device and of the viewing filter pair in mind, or—much better—the separation filter pair, the display device and the viewing filter pair must be chosen together, i.e. optimized according to the invention. In particular, the separation filters are preferably "white balanced", i.e. when white light is shone through the two filters and the resulting colours added on the display, the visual impression must again be "white". This is not required, and rarely achieved, in the viewing filters.

Colour Correction

As mentioned above, the use of colour correction may often be restricted to specific image areas or narrow hue ranges and serve to alleviate the few adverse effects of colour coding. Quite apart from spot colour deviations, a general drift of hues will usually be observed in an uncorrected stereogram. Correction for the hue changes, along with correction aimed at the problems mentioned in the introduction, can be performed at all levels: general hues (even colour tables), full colour space, individual pixels in the fused image, individual pixels compared with original pixel values, individual pixels compared with homologous point pairs and—going to the absolute extreme—lists of pixels in which each but the first is the observed homologous point belonging to its predecessor on the list.

Colour computations and colour match experiments are described in detail in the books mentioned above and their references; so to illustrate their use in the context of the present invention it suffices to show how to identify and address the phenomena relevant to colour coded stereograms. For the sake of conciseness, almost all operations in the following will therefore be linear and based on a relatively low spectral resolution (one reading per 25 nanometers in the range 400 to 700 nanometers).

So, assume for definiteness that a display method is given which makes use of RGB-primaries corresponding to "white" light at 6500 K, as computed according to the CIE formulas, then filtered through the Kodak Wratten (R,G,B)-separation filters. Likewise, assume that the given viewing filter pair are a blue and a yellow, respectively, with the spectral transmittance effects listed in Table 1 (in the range from 400 nm to 700 nm, steps of 25 nm, values recorded to two decimal digits).

Assume that the perceived colour of a single human eye can be modelled by RGB-values computed by means of the "eye" recommended by the Optical Society of America:

R=0.799X+0.4194Y−0.1648Z

G=−0.4493X+1.3265Y+0.0927Z

B=−0.1149X+0.3394Y+0.717Z where X, Y and Z are the 1964 CIE tristimulus colour values at 6500" K, again taking the 13 values in the range 400 nm to 700 nm, steps of 25 nm.

To make the eye and the primitives "hue consistent", introduce a calibration: the (R,G,B)-to-(R,G,B) transmission will in the present approximation be linear, given by the matrix $M=E \cdot (L::[C;C;C])^T$, where E is the 3 by 13 matrix of eye responses, L is the 3 by 13 matrix of primary spectral values and the operation L::[C;C;C] corresponds to the action of L on the spectral distribution of 6500K white light—in essence a pointwise multiplication of spectral transmission values. Ideally, the resulting matrix M should turn out to be the identity matrix, but this requires negative lobes in either the primitives or the eye, or both. Ideal hue consistency (no hue drift) requires M to be a positive definite, symmetric circulant matrix (rows of M having the form a b b, b a b, b b a with $a \geq 1/3$); and approximate hue consistency (uniform hue drift) requires that M be circulant (rows of M having the form a b c, c a b, b c a). Introduce two diagonal matrices, D and H, and replace M by D·M·H, the equivalent of calibrating the settings of the primaries according to H and of the eye readings according to D. Determining D and H by performing a non-linear least squares optimization (keeping their first elements identically equal to 1 for definiteness) towards the goal that D·M·H be circulant results in the calibration factors: (1, 1.64, 1.044) as diagonal entries of D, and (1, 0.593, 1.017) as the diagonal entries for H. For definiteness, D·M·H can be finally subjected to a scaling, so that (R,G,B)=(1,1,1) maps to a vector with maximum element 1.

As an auxiliary formula for the gray level of an (R,G,B)-colour, take the Y-value (also sometimes called luminance) of the official NTSC formula; i.e. if r is a vector of (R,G,B)-values, let the scalar product y=[0.30 0.59 0.11]·r represent its NTSC-luminance. The operational set of colours will be the (R,G,B)-values for 36 colours of equi-distributed hue, maximal saturation and maximal value, according to the "hex-cone" HSV model. The following calculations will be done using (R,G,B)-values and the compound matrices as described above.

The model for the colours seen by one eye through filter F1 is summarized in a matrix $M_1 = D \cdot E \cdot (L::[F_1::C;F_1::C;F_1::C])^T \cdot H$, where again the symbol:: denotes pointwise multiplication, the computational equivalent of filter combination. By the same token, the effect of F2 is given by $M_2 = D \cdot E \cdot (L::[F_2::C;F_2::C;F_2::C])^T \cdot H$. The row vectors $F_1$ and $F_2$ hold the rows marked "B" and "Y" in Table 1, respectively. Then the displayed-to-perceived (R,G,B) transmission can be modelled by the weighted average $P = wM_1 + (1-w)M_2$. For the present purposes, take w=1/5 to obtain "white adaptation" very much like that of the true human eye-brain system. Much more sophisticated (non-linear) models of the perceived colours are possible and often useful; but the colour correction actions described below remain qualitatively the same. Finally, to avoid comparisons of e.g. lightnesses perceived with and without viewing filters, scale P so that (again) (R,G,B)=(1,1,1) maps to a vector with maximum element 1.

The resulting matrices are:

$$M = \begin{matrix} 0.7265 & 0.2351 & 0.0064 \\ 0.2444 & 0.6504 & 0.1052 \\ 0.0398 & 0.1333 & 0.6950 \end{matrix}$$

$$M_1 = \begin{matrix} 0 & 0.0000 & 0.0025 \\ 0 & 0.0003 & 0.0346 \\ 0 & 0.0005 & 0.2924 \end{matrix}$$

$$M_2 = \begin{matrix} 0.0939 & 0.0235 & 0.0002 \\ 0.0310 & 0.0611 & 0.0046 \\ 0.0051 & 0.0121 & 0.0259 \end{matrix}$$

$$P = \begin{matrix} 0.7937 & 0.1989 & 0.0073 \\ 0.2624 & 0.5174 & 0.1120 \\ 0.0428 & 0.1033 & 0.8370 \end{matrix}$$

A perceived colour (where the viewer has the filter F1 in front of one eye and the filter F2 in front of the other), as computed according to this discrete, piecewise linear model, is now given as p=Pr, where r is the vector of displayed (R,G,B)-values, and p the vector of perceived (R,G,B)-values.

The first step of the general colour correction of a colour coded stereogram consists of a shift of all hues, in order to balance the hue deviations. For the present example, a shift corresponding to an addition of 1/144 to all hues give a better distribution of hue deviations, as can be seen in Table 2: With the displayed hues given in the rows marked "H" and the perceived hues in the rows marked "p", the largest deviations are found in the "G to C" range, column 5 (0.4571 vs. 0.5252) and in the "M to R" range, column 1 (0.8325 vs. 0.8074), the difference range thus being [−0.0681; 0.0251]. After the shift, the perceived hues are as in the rows marked "Ps", and the largest deviations are now balanced, as seen in the "G to C" range, column 6 (0.4914 vs. 0.5410) and in the "M to R" range, column 2 (0.8804 vs. 0.8298), the difference range being the nearly symmetric interval [−0.0496; 0.0506 ].

After the hue shift, there will be at least one, and generally an even number of hues that are truthfully rendered, the fixed points of the hue-to-hue mapping. Between such fixed points, the hue circle can now be further re-parameterized to give a more truthful rendition of all colours. From a mathematical point of view, such a re-parameterization has the effect of a local inversion, and so can be done by, say, interpolation. (For ease of comparison of values, no such re-parameterization is done here).

Swoon colours are those for which there is a severe lightness loss from displayed colours to perceived colours. Flare colours, conversely, are perceived as being too luminous. The simple remedy is to adjust the lightness of all hues, for which the perceived lightnesses fall outside some chosen limits. (Where the displayed colours are fully saturated, lightness can only be increased at the loss of some saturation). The ratio of NTSC-luminances of p=Pr to r for the 36 r's are given in Table 3. In the present case, relatively mild swoon effects are noticeable in the green-to-cyan range, and there is an isolated flare around pure blue. It should be noted, that the latter is automatically reduced by the colour coding technique described above under "image separation".

The remaining phenomena are best treated as "spot colours", and hence should only be identified at this stage: Luminance sheen colours are those for which the lightness differences between the colours reaching the two eyes is excessive. Chromatic sheen colours are those for which the differences between the hues of colours reaching the two eyes is excessive. As a rule of thumb, luminance sheen is only really noticeable when chromatic sheen is low and vice versa. A table such as Table 4 helps locating the relevant colour ranges: where one of the numbers marked "L" and "H" is numerically large and the other small, sheen can be observed. In the present case, there is some luminance sheen around pure blue, which like the flare is alleviated by the colour separation. Chromatic sheen can be observed around pure cyan and pure magenta. Generally speaking, the remedies are to exchange saturation for lightness to alleviate chromatic sheen and vice versa to alleviate luminance sheen. Also, a localized hue shift towards hues with lower sheen effects is allowable for spot colours, and this latter would probably be recommendable in the present case for the chromatic sheens in pure cyan and pure magenta, if they were to appear as intense spot colours in an image.

Finally, ghost colours can be determined by computing the two colours resulting from separation and subsequent passage through one viewing filter, then finding those which give rise to excessive differences when reaching the corresponding eye. Ghost colours must be found for the eyes separately, and as for sheen, a distinction may be made between luminance ghosting and chromatic ghosting. Again, the typical remedy is to allow certain hue shifts; but with ghost colours it should be kept in mind that the effect is typically most visible near the borders of scene objects, so the application of such shifts can be localized to such areas of the image, especially if the hue shift can be made gradual. At the same time, the colour leakage, required as part of the invention, is really a faint (and controlled) chromatic ghost effect and must be identified as such.

"Spot colour" correction thus usually takes the form of a combined hue shift and lightness re-balancing between the two partial images, either before fusion or in the fused image.

ASPECTS OF THE INVENTION

In a first aspect, the invention is therefore concerned with a test of or a method of identifying a given or proposed viewing filter set as against a given or proposed set of display primaries. The outcome of the test is three numbers.

In a second aspect, the invention is concerned with the application of special colour correction techniques to colour separated stereograms or conventional colour anaglyph stereograms, such that the resulting perceived stereogram has colours close to the those of the original or intended scene, while artefacts caused by the use of coloured viewing filters are reduced.

In a third aspect, the invention is concerned with a method for obtaining a stereogram, called a colour coded stereogram, which consists of two partial images fused together in such a manner that when the stereogram is displayed on a device with known spectral properties and viewed through correctly chosen coloured filter pairs, the effect approximates that of viewing a two-channel display of stereogram consisting of one full colour partial image combined with one gray scale partial image, these two partial images being brought in visual balance.

In a fourth aspect, the invention is concerned with special combinations of coloured filter pairs for viewing colour coded stereograms as well as for viewing conventionally separated colour anaglyphs.

In a fifth aspect, the invention is concerned with a method for choosing or constructing special combinations of coloured filter pairs and optionally combining the resulting choice or construction with the specification of a sequence of colour correction steps to apply to the stereograms to be viewed with the filter pair.

In sixth aspect, the invention is concerned with the application of coloured filter pairs for modifying each of the partial images in a conventional two-channel stereoscopic display, prior to the fusion of the images on the display surface, the coloured filter pairs being chosen so that the resulting fused stereograms are suitable for viewing on the given display with a selected pair of coloured viewing filters, such as the filters mentioned above as a fourth aspect, or filters selected according to the method mentioned above as a fifth aspect.

In a seventh aspect, the method is concerned with the display, using 2-channel techniques, of a stereogram so prepared that one partial image is in full colour, the other monochrome, the visual balance between the two being suitably adjusted.

In an eighth aspect, the invention is concerned with the mounting of the special viewing filter pairs, mentioned above as a fourth aspect, in spectacles, lorgnettes, frames or the like.

In a ninth aspect, the invention is concerned with an apparatus, such as a specially constructed electronic camera, optionally containing a coloured filter pair and containing means of separation and fusion so chosen that images recorded with the camera consist of two stereoscopically fused partial images, the colour contents of which in essence make the picture a colour coded stereogram or a specially prepared anaglyph, suitable for viewing on a given display through selected viewing filter pairs, such as the filters mentioned above as a fourth aspect, or filters selected according to the method mentioned above as a fifth aspect.

In a tenth aspect, the invention is concerned with an apparatus, such as a specially constructed optical adaptor to mount on an existing camera, the adaptor containing a coloured filter pair and means of separation and fusion so chosen that images recorded through the adaptor consist of two stereoscopically fused partial images, the colour contents of which in essence make the picture a colour coded stereogram or a specially prepared anaglyph, suitable for viewing on a given display through selected viewing filter pairs, such as the filters mentioned above as a fourth aspect, or filters selected according to the method mentioned above as a fifth aspect.

PREFERRED EMBODIMENTS OF THE INVENTION

Thus, in a first embodiment, the invention makes use of a spectrophotometer for measuring the spectral distributions of filters combined with calorimetric computations of the passage of light of a given spectral distribution through filters of a given spectral characteristic, the computations allowing the numerical determination of the numbers R2, R21 and R1 as described above.

In a second embodiment, the colour deficiences are computed from the known spectral properties of the display primaries and the chosen filters, the computations optionally supplemented or replaced by observations on a series of test images, whereupon a hue shift, a hue re-parameterization, a saturation enhancement distribution and a brightness enhancement distribution are determined from formulas akin to those presented above and applied to electronic images on the picture element level, and methods and criteria for the further application of spot colour correction are chosen and applied.

Figure 18:
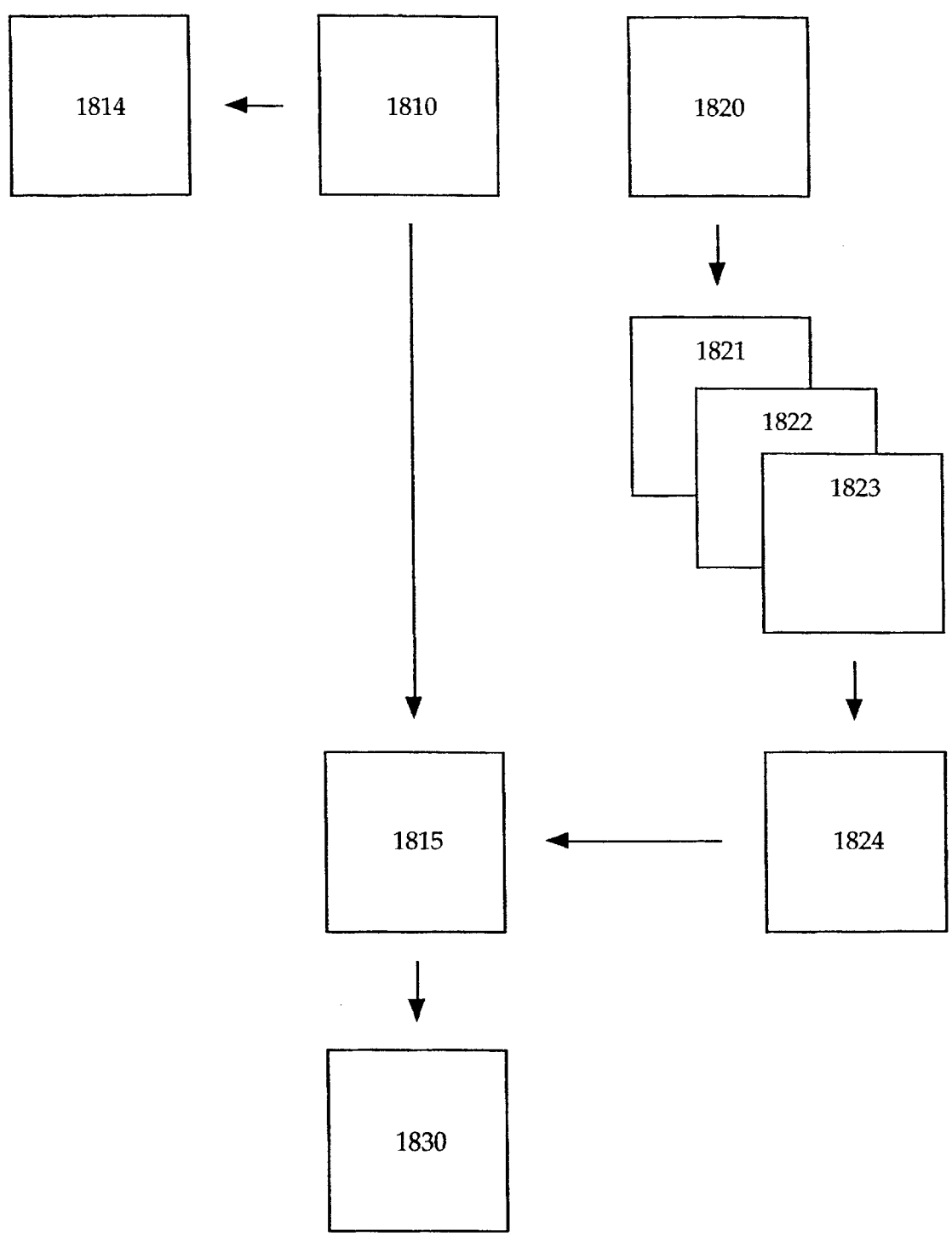

In a third embodiment, the two partial images of a conventional stereogram are brought into some form of digital representation, the left partial image has its blue "plane" or "channel" removed, the right partial image is replaced by a monochrome image resulting as a weighted average of its R-, G- and B-planes with weights (0.15, 0.15, 0.7), and the monochrome image, considered as a one-plane image, is then substituted for the missing plane of the left partial image, see FIG. 18.

Figure 2:
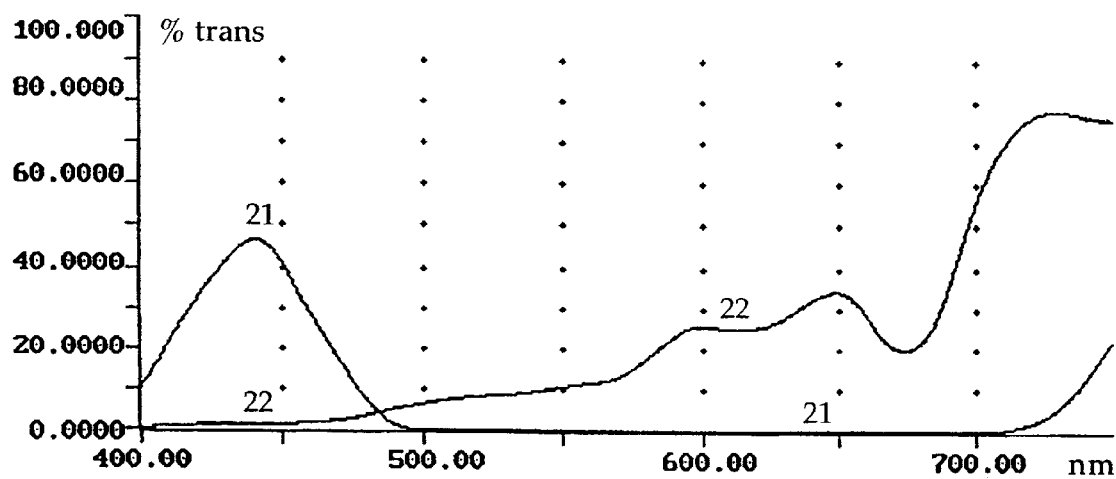
Figure 3:
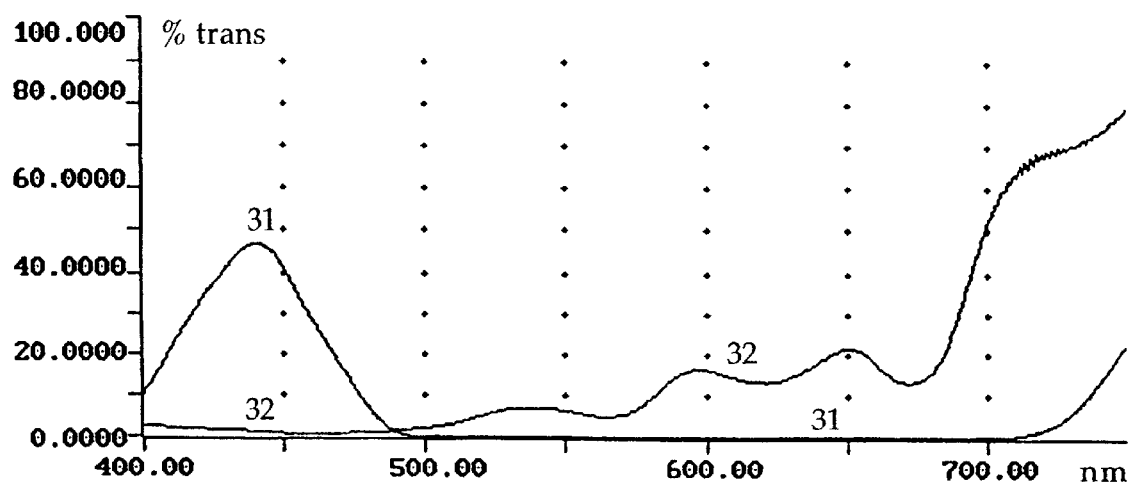
Figure 4:
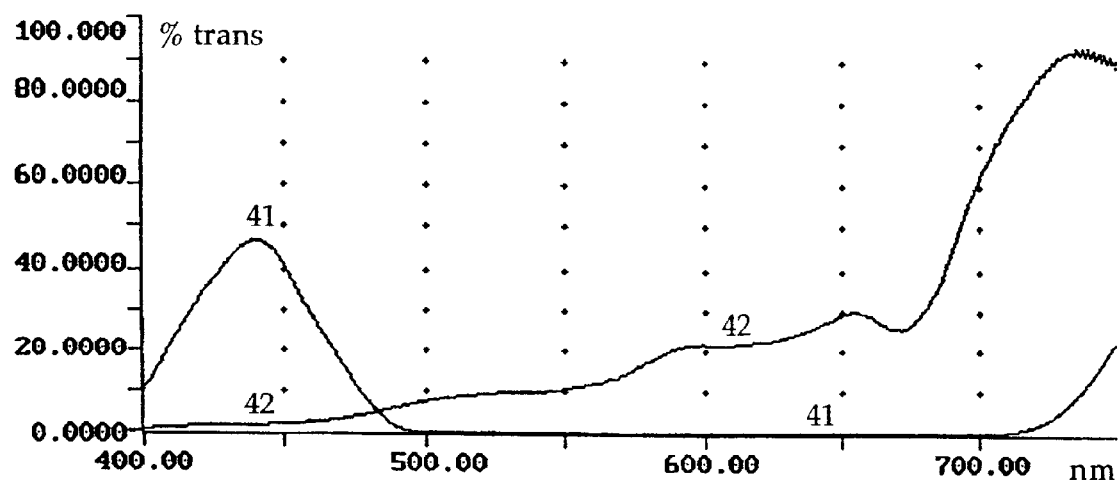
Figure 5:
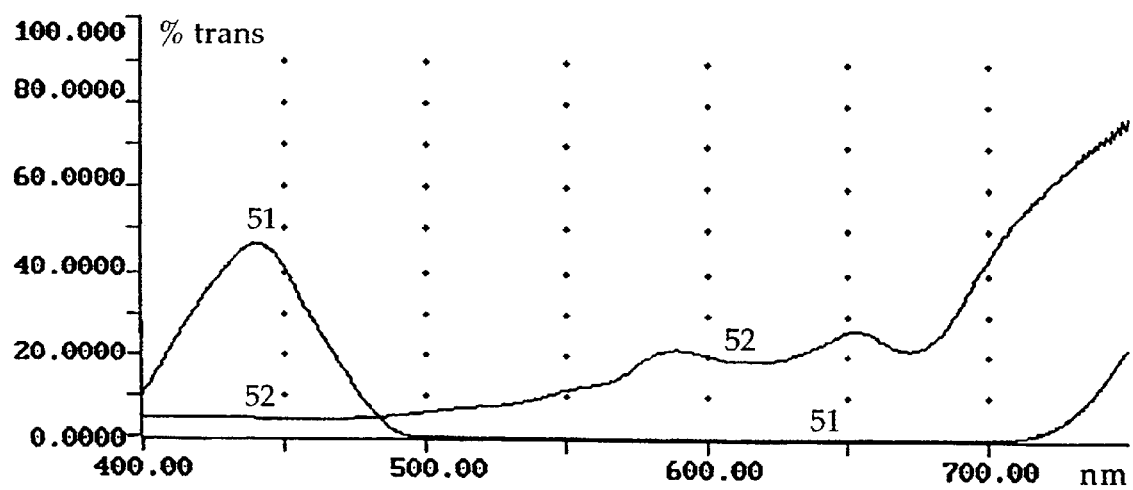
Figure 6:
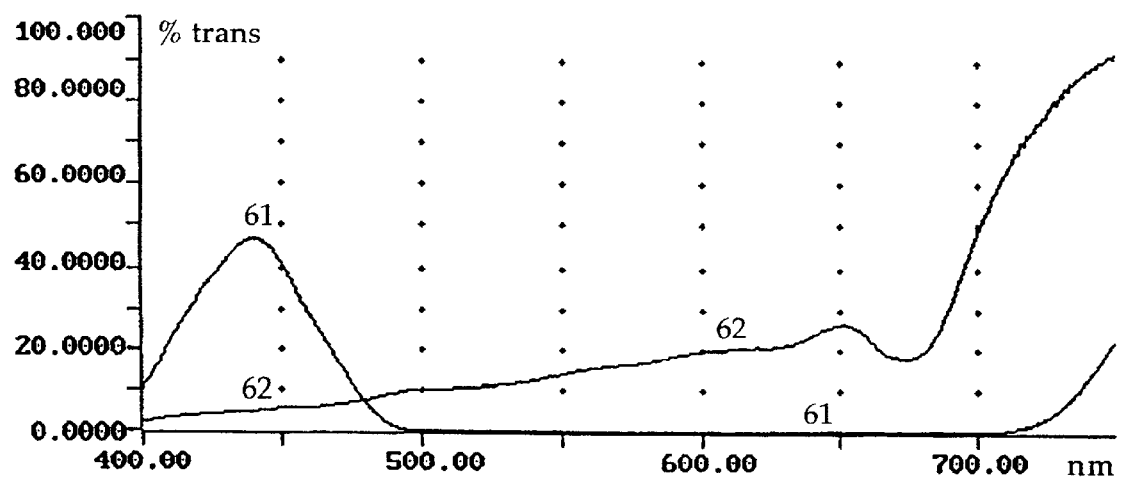
Figure 7:
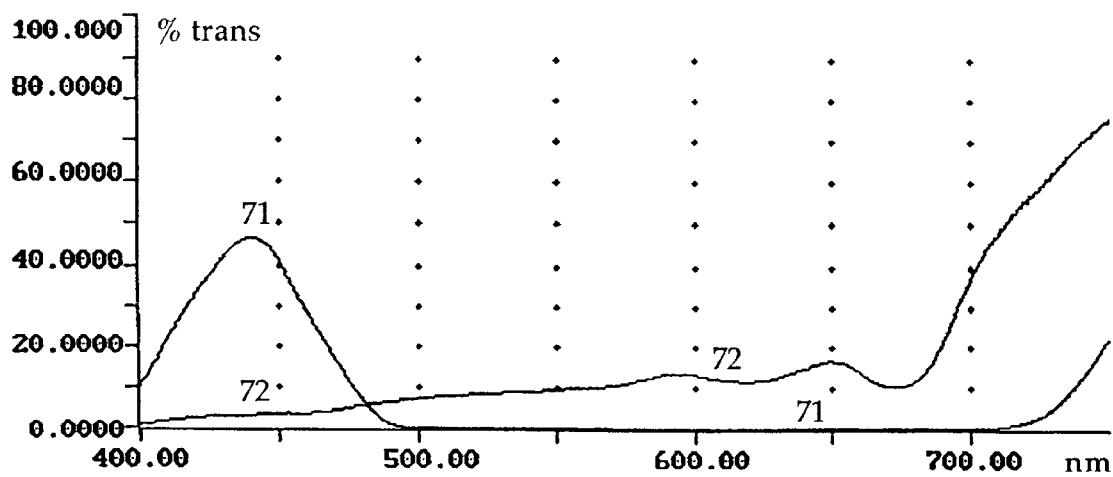
Figure 8:
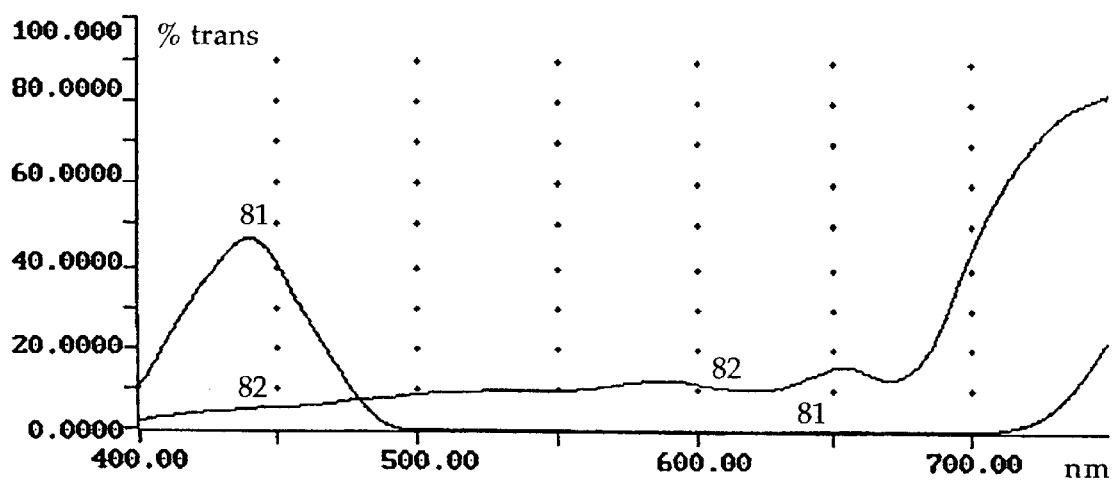

In a fourth embodiment, the invention comprises a pair of coloured filters with the spectral transmission characteristics shown in FIG. 2, mounted in a pair of spectacles or a viewing frame for the viewing of colour coded stereograms or conventionally separated colour anaglyphs.

In a fifth embodiment, the invention makes use of known spectral distributions of primaries of a display and selects, from a set of available filters, those pairs which pass the colour coding test as described above and further selects, from the pairs thus found, that pair or those pairs, which give the most satisfactory colour balance, as determined by one or more human observers viewing a selection of test images.

Figure 9:
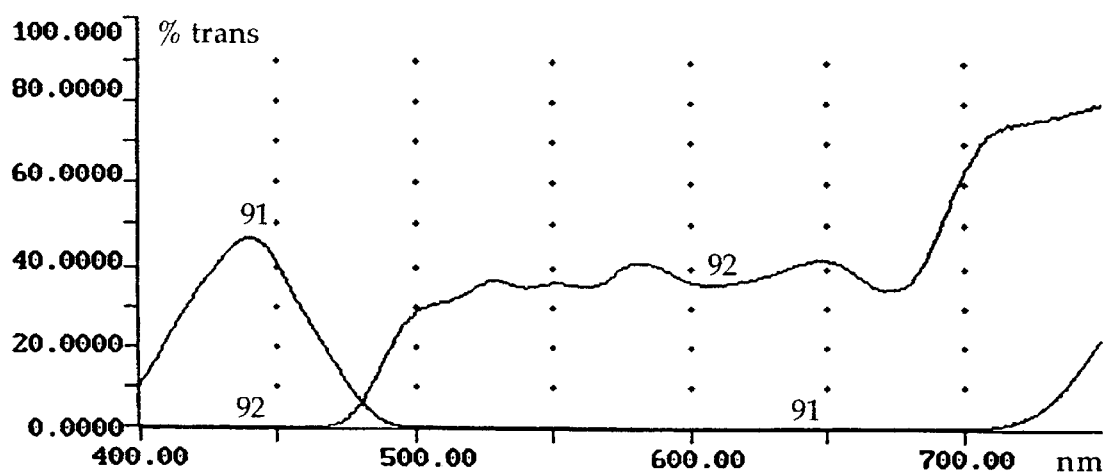
Figure 10:
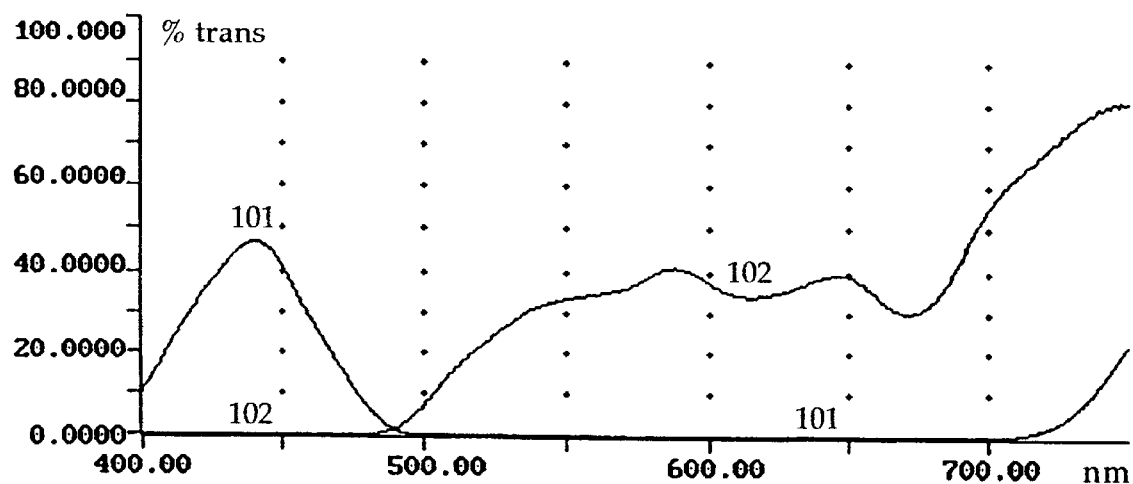
Figure 11:
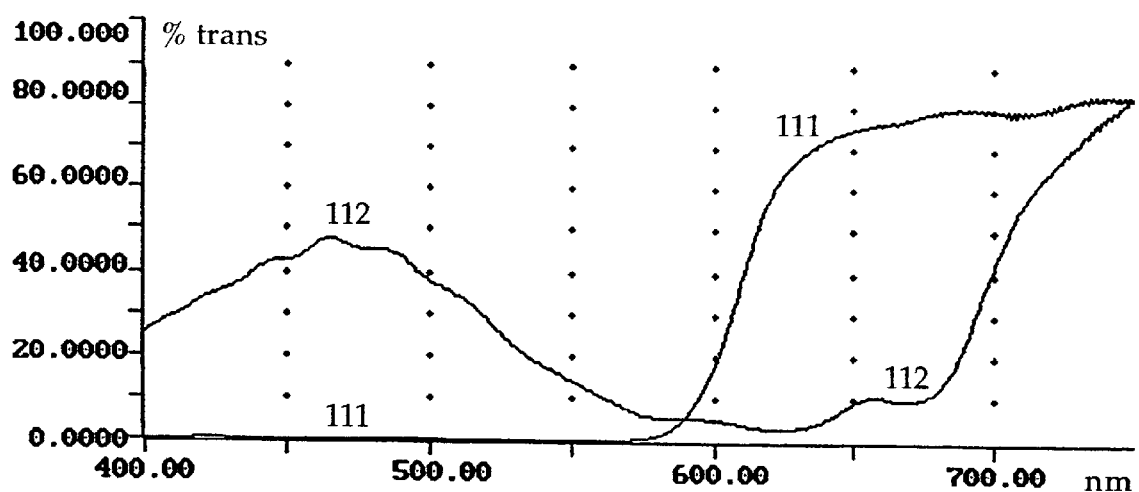
Figure 12:
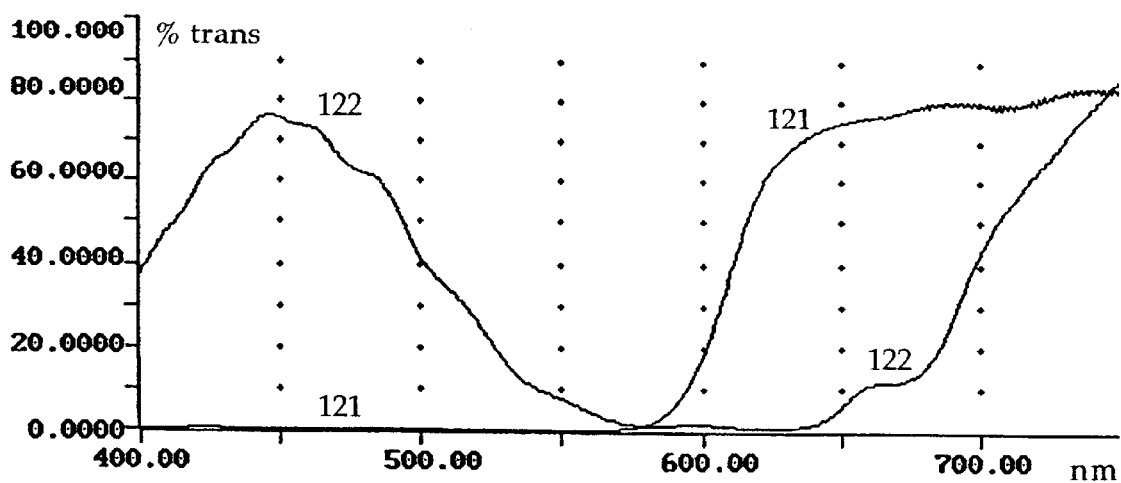
Figure 13:
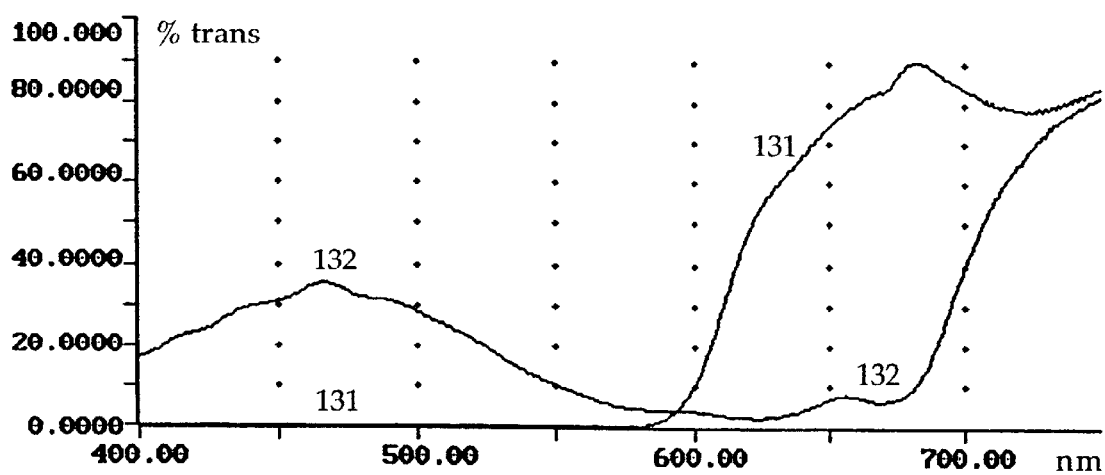
Figure 14:
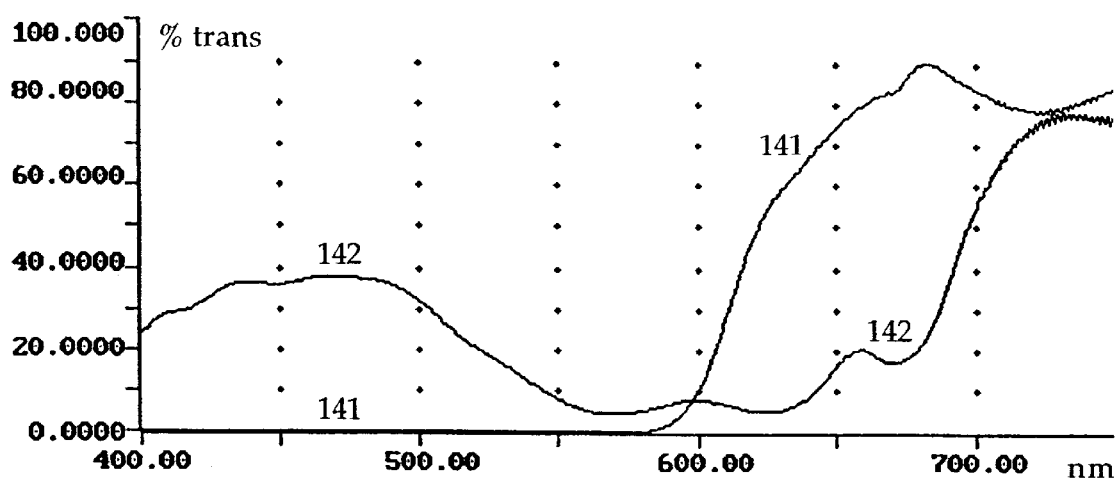
Figure 15:
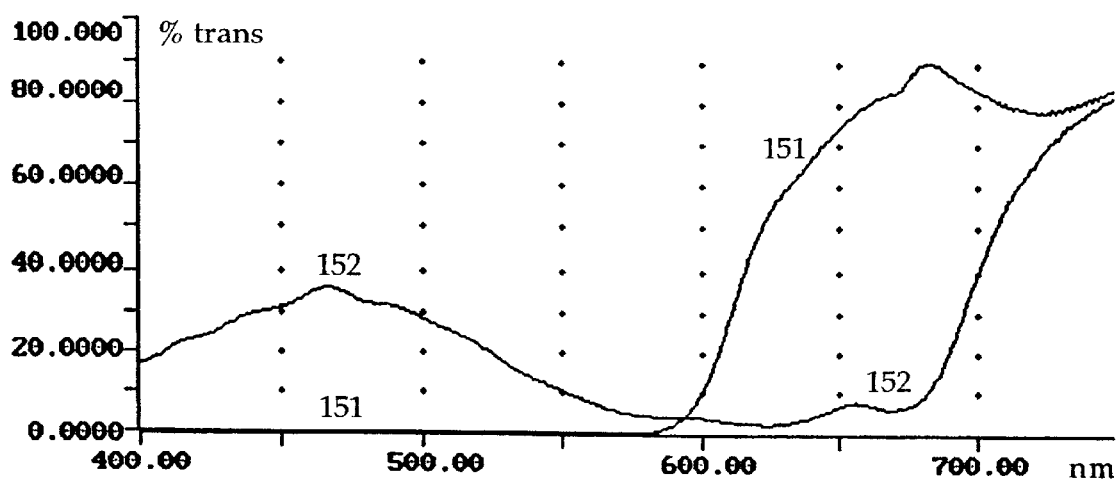

In a sixth embodiment, a stereoscopic image is shown on a screen using a conventional two-channel stereoscopic projector, the partial images being filtered through two coloured filters with spectral transmission characteristics as in FIG. 9.

In a seventh embodiment, a stereoscopic image is shown on a monitor or screen, the partial images alternating (-they are thus stereoscopically separated by means of a display-synchronized viewing device-), one partial image being shown in essentially full colour, the other as a monochrome image, optionally with reduced contrast and intensity.

In an eighth embodiment, filters like those of the fourth embodiment or selected according to the fifth embodiment are mounted in a pair of spectacles.

In a ninth embodiment, two electronic cameras are mounted on e.g. a rail to facilitate variation of the distance of their lenses, the lenses always remaining in the same plane, one or both camera lenses being optionally equipped with coloured filters, the electronic signals from the cameras being subsequently fused, according to the techniques of the third embodiment, into the signal required for the display of one stereoscopic image.

Figure 17:
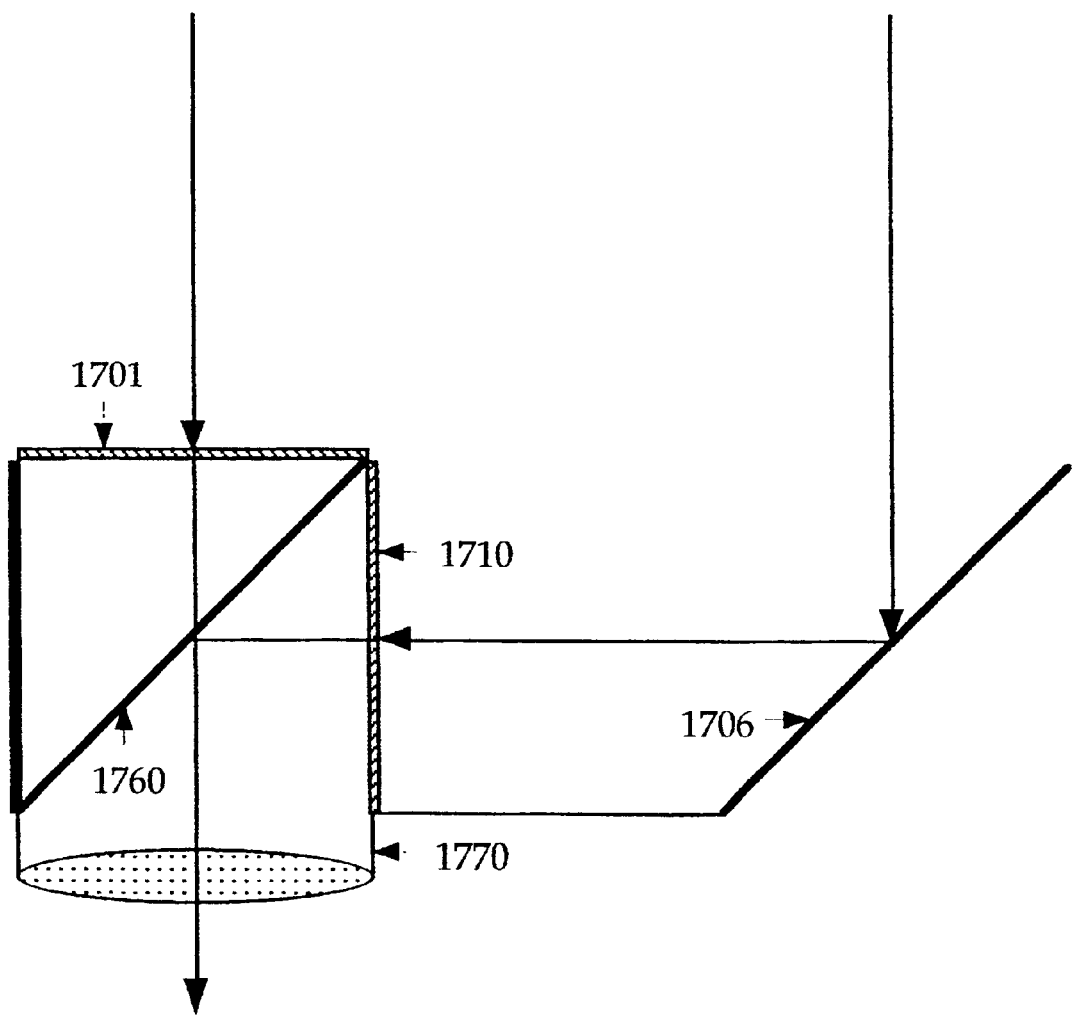

In a tenth embodiment, an adaptor much like a conventional range finder is equipped with separation filters, tested against a pair of viewing filters, such as the filters mentioned above as a fourth aspect, or filters selected according to the method mentioned above as a fifth aspect, and placed in a house that can be mounted on a camera lens, see FIG. 17.

LIST OF TABLES

Table 1 shows the spectral transmittances of two coloured filters marked "B" and "Y" in the spectral range from 400 nm to 700 nm, one reading per 25 nm, maximal theoretical transmittance scaled to 1, readings given with two decimal digits.

Table 2 shows the hues according to the "hex-cone" model of the computed (R,G,B) values of 36 colours. The rows marked "H" stem from multiples of the form Mr, the rows marked "P" from multiples of the form Pr and the rows marked "Ps" from multiples of the form Ps. Here, M and P are the matrices defined under "colour correction" above; each vector r is taken from 36 hue-equidistant vectors on the perimeter of the "hex-cone" with the first vector at pure red; and each vector s likewise taken from the perimeter of the "hex-cone" but with 1/144 added to the hue-values, as compared to those of the r's. Table 3 shows ratios of NTSC-luminances, Lm/Lp. The Lm-values were computed from the Mr's, the Lp-values from the Ps's, see description of Table 2 above.

Table 4 shows NTSC-luminance differences (rows marked "L") vs. scaled hue differences (rows marked "H") between the (R,G,B)-values computed for each eye, according to the models described under "colour correction" above. The luminance differences are thus confined to the interval [−1;1]. The hue differences were computed modulo 0.5, then scaled by a factor 2 to let them fall in the interval [0;1], facilitating observations.

LIST OF FIGURES

In the FIGS. 1 to 15, pairs of spectral transmittance curves are shown for filter pairs mentioned in the claims below. Transmittances were measured with a spectrophotometer, the relevant spectral range of measurement being 400 nm to 700 nm and the range of the transmittance readings given as 0% to 100%. In each of these figures, one curve is labelled "xx1", the other "xx2", where "xx" is the figure number.

FIGS. 1 to 10 each show the spectral transmission characteristics of a pair of coloured filters as measured with a spectrophotometer, the filter labelled "xx1" being essentially blue, the filter labelled "xx2" being essentially yellow.

FIGS. 11 to 15 each show the spectral transmission characteristics of a pair of coloured filters as measured with a spectrophotometer, the filter labelled "xx1" being essentially red, the filter labelled "xx2" being essentially cyan.

Figure 16:
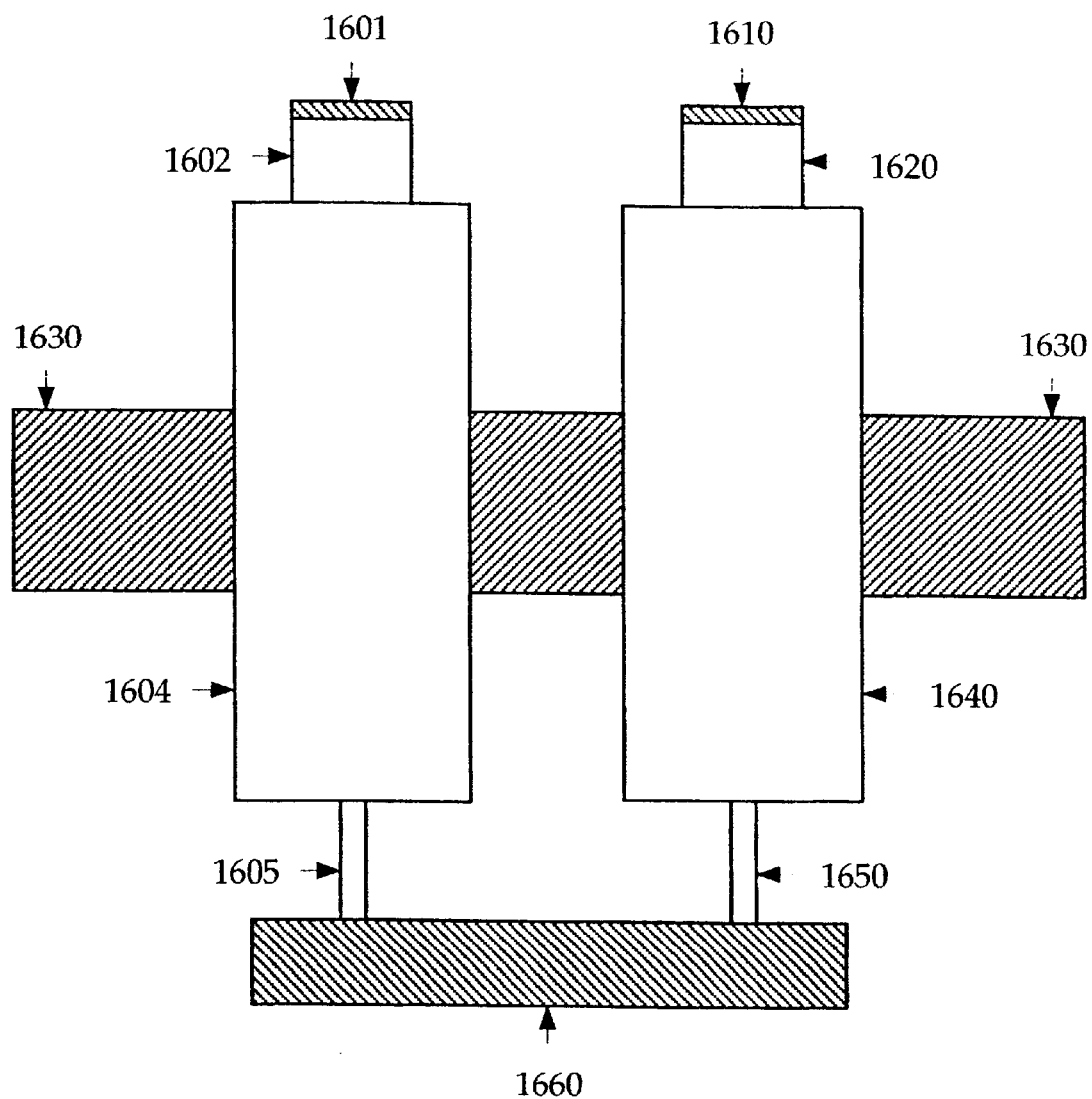

FIG. 16 shows, in a diagrammatic form, a camera or similar means of recording a stereogram in such a fashion that a substantial part of the image separation and optional colour correction characterising the invention is performed as an integral part of the recording. The camera, which essentially consists of two cameras operating in tandem together with means of stereogram fusion, comprises optional optical filters 1601 and 1610, lens systems 1602 and 1620, means 1630 of adjusting the distance between the lens systems, means 1604 and 1640 of converting the images that have entered the lens systems 1602 and 1620 into electronic form, means 1605 and 1650 of further submitting these electronic signals and means 1660 of fusing them into a stereogram.

FIG. 17 shows, in a diagrammatic form, an adaptor or similar means of allowing a camera to record an image that emulates a colour coded stereogram, the adaptor comprising optical filters 1701 and 1710, means 1706 and 1760, such as a mirror and a semitransparent mirror, of fusing the images into a stereogram, and means 1770 of mounting the adaptor on the camera.

FIG. 18 shows, in a diagrammatic form, how the two partial images of a conventional stereogram (both images brought into some form of digital representation) can be converted into a colour coded stereogram 1830. The left partial image 1810 has its blue "plane" or "channel" 1814 removed, the right partial image 1820 is replaced by a monochrome image resulting as a weighted average of its R- 1821, G- 1822 and B- 1823 planes with weights (0.15, 0.15, 0.7) and the monochrome image 1824, considered as a one-plane image, is then substituted for the missing plane of the left partial image 1815.

Note: several of the claims below make reference to filter pairs as defined by the curve pairs shown in the figures. These curves are measured using spectrophotometry and are therefore accurate to the limits of the apparatus, these limits being generally much more narrow than the accuracy of production, so the curves are, in a sense, unduly accurate. Also, many filter pairs will work just as well if subject to damping by neutral density filters or, as a kind of opposite operation, produced with a higher transmittance, equivalent of peeling off neutral density filter effects. Therefore, and to avoid unnecessarily long formulations, a simplifying convention is used throughout. Given a filter curve, its envelope is here meant to be a curve pair surrounding the given curve: wherever the given curve represents a substantial value, chosen to be an absolute transmittance of 20 percent or more, the envelope curve pair is obtained from the given curve by adding and subtracting a relative value of 10 percent of the value represented by the given curve. Wherever the given curve represents an absolute transmittance of less than 20 percent, the envelope curve pair is obtained by adding and subtracting an absolute value of 2 percent. If either of the envelope curves thus obtained falls outside the boundary of 0 percent to 100 percent absolute transmittance, it is deformed to lie on the boundary over the range in question. Now, two different curves are said to be spectrally equivalent, if any multiple (point-wise multiplication with a single numerical factor) of one curve falls inside the envelope of the other over a total range, possibly divided into two or more parts, of 260 nanometers or more of the range from 400 nanometers to 700 nanometers. Likewise, a given curve pair (such as appear in the figures) will be called spectrally equivalent with another, trial, curve pair, if one curve of the given pair is spectrally equivalent with one of the curves of the trial pair, and the other curve of the given pair is spectrally equivalent with the other curve of the trial pair.

TABLES

| 400–550 nm | B | 0.20 | 0.53 | 0.39 | 0.08 | 0 | 0 | 0 |
|---|---|---|---|---|---|---|---|---|
| | Y | 0.01 | 0.03 | 0.04 | 0.06 | 0.08 | 0.09 | 0.10 |
| 575–700 nm | B | 0 | 0 | 0 | 0 | 0 | 0 | |
| | Y | 0.13 | 0.13 | 0.11 | 0.18 | 0.10 | 0.39 | |

TABLE 1

Spectral transmittances for two filters

| R to Y | H | 0.0496 | 0.0689 | 0.0872 | 0.1046 | 0.1213 | 0.1373 |
|---|---|---|---|---|---|---|---|
| | P | 0.0487 | 0.0627 | 0.0761 | 0.0890 | 0.1014 | 0.1133 |
| | Ps | 0.0441 | 0.0558 | 0.0695 | 0.0826 | 0.0953 | 0.1074 |
| Y to G | H | 0.1525 | 0.1700 | 0.1906 | 0.2136 | 0.2392 | 0.2679 |
| | P | 0.1248 | 0.1379 | 0.1567 | 0.1835 | 0.2150 | 0.2517 |
| | Ps | 0.1191 | 0.1308 | 0.1464 | 0.1693 | 0.1987 | 0.2326 |
| G to C | H | 0.3005 | 0.3383 | 0.3808 | 0.4203 | 0.4571 | 0.4914 |
| | P | 0.2949 | 0.3545 | 0.4187 | 0.4768 | 0.5252 | 0.5532 |
| | Ps | 0.2724 | 0.3209 | 0.3874 | 0.4484 | 0.5038 | 0.5410 |
| C to B | H | 0.5206 | 0.5439 | 0.5658 | 0.5866 | 0.6063 | 0.6250 |
| | P | 0.5706 | 0.5844 | 0.5977 | 0.6104 | 0.6226 | 0.6344 |
| | Ps | 0.5628 | 0.5776 | 0.5911 | 0.6041 | 0.6166 | 0.6286 |

TABLE 1-continued

Spectral transmittances for two filters

| B to M | H | 0.6428 | 0.6613 | 0.6864 | 0.7153 | 0.7485 | 0.7871 |
|---|---|---|---|---|---|---|---|
| | P | 0.6456 | 0.6629 | 0.6852 | 0.7103 | 0.7386 | 0.7706 |
| | Ps | 0.6401 | 0.6536 | 0.6737 | 0.6974 | 0.7240 | 0.7541 |
| M to R | H | 0.8325 | 0.8804 | 0.9245 | 0.9652 | 0.0029 | 0.0310 |
| | P | 0.8074 | 0.8557 | 0.9048 | 0.9503 | 0.9926 | 0.0269 |
| | Ps | 0.7884 | 0.8298 | 0.8807 | 0.9280 | 0.9718 | 0.0118 |

TABLE 2

Computed hues. Input to the computations are described under "colour correction". Rows marked "H" hold the values of hues seen by a computational "eye" without any filtering. Rows marked "P" hold the hues seen by a pair of computational "eyes", one "eye" seeing the hues of the "H" rows through the filter marked "B" in Table 1, the other seeing the same hues through the filter marked "Y" in Table 1, the stereoscopic fusion computed as a weighted average.
The rows marked "Ps" are computed as the rows marked "P", but from "hex-cone" values with I/144 added to the hues, compared to those used for the "H" and "P" rows.

| R to Y | 1.10 | 0.96 | 0.94 | 0.92 | 0.91 | 0.90 |
|---|---|---|---|---|---|---|
| Y to G | 0.89 | 0.96 | 0.95 | 0.93 | 0.92 | 0.90 |
| G to C | 0.87 | 0.79 | 0.81 | 0.82 | 0.84 | 0.85 |
| C to B | 0.86 | 0.95 | 0.98 | 1.01 | 1.07 | 1.16 |
| B to M | 1.36 | 0.96 | 0.99 | 1.01 | 1.02 | 1.03 |
| M to R | 1.04 | 1.13 | 1.13 | 1.12 | 1.12 | 1.12 |

TABLE 3

Ratios of NTSC-luminance values for the (R, G, B)-values giving rise to the values marked "H" in Table 2 over the NTSC-luminance values for the (R, G, B)-values giving rise to the values marked "Ps" in Table 2.

| R to Y | L | 0.51 | 0.58 | 0.66 | 0.75 | 0.83 | 0.91 |
|---|---|---|---|---|---|---|---|
| | H | 0.80 | 0.99 | 0.98 | 0.96 | 0.93 | 0.91 |
| Y to G | L | 1.00 | 0.99 | 0.91 | 0.82 | 0.73 | 0.64 |
| | H | 0.88 | 0.86 | 0.83 | 0.78 | 0.73 | 0.66 |
| G to C | L | 0.55 | 0.46 | 0.37 | 0.28 | 0.19 | 0.10 |
| | H | 0.58 | 0.69 | 0.67 | 0.64 | 0.60 | 0.57 |
| C to B | L | 0.01 | −0.08 | −0.17 | −0.25 | −0.33 | −0.42 |
| | H | 0.53 | 0.50 | 0.45 | 0.39 | 0.28 | 0.16 |
| B to M | L | −0.50 | −0.50 | −0.41 | −0.32 | −0.23 | −0.14 |
| | H | 0.06 | 0.05 | 0.29 | 0.54 | 0.64 | 0.69 |
| M to R | L | −0.05 | 0.04 | 0.13 | 0.22 | 0.31 | 0.40 |
| | H | 0.72 | 0.74 | 0.75 | 0.77 | 0.78 | 0.79 |

TABLE 4

Rows marked "L" hold the NTSC-luminance differences between the colours seen by the two filtered computational "eyes" applied in the computation of Table 2. Rows marked "H" hold the corresponding hue differences, computed modulo 0.5, and subsequently scaled by a factor 2.

What is claimed is:

1. A method of identifying a pair of coloured optical filters for viewing stereograms, the method comprising the steps of:
   selecting a display device,
   selecting a set P of colours, displayable on the display device, and calling the members of P the primaries,
   naming the filters "the 1-filter" and "the 2-filter",
   partitioning the display primary set P into two disjoint sets I and II, so that P=I+II, while I and II have no common member,
   displaying a first image uniformly coloured in the most luminous colour available when using the full set P, measuring the spectral transmission characteristics and calculating the y-value, Lu, according to the 1931 CIE tristimulus colour matching functions, of the first image seen through the 2-filter, displaying a second image uniformly coloured in the most luminous colour available when using the I-set, measuring the spectral transmission characteristics and calculating the y-value, L11, according to the 1931 CIE tristimulus colour matching functions, of the second image seen through the 1-filter, measuring the spectral transmission characteristics and calculating the y-value, L12, according to the 1931 CIE tristimulus colour matching functions, of the second image seen through the 2-filter, displaying a third uniformly coloured image in the most luminous colour available when using the II-set, measuring the spectral transmission characteristics and calculating the y-value, L21, according to the 1931 CIE tristimulus colour matching functions, of the third image seen through the 1-filter, measuring the spectral transmission characteristics and calculating the y-value, L22, according to the 1931 CIE tristimulus colour matching functions, of the third image seen through the 2-filter, computing the numbers R1=L21/L11, R21=L21/Lu and R2=L12/L22, accepting as a valid filter pair the 1-filter and the 2-filter, if:

R1$\leq$0.05, R21$\leq$0.01 and R2$\geq$0.01.

2. A method according to claim 1, wherein the display device is equipped with coloured optical filters for colour separation adapted to partition P into I and II.

3. A method according to claim 1, further comprising a balancing of the two filters by means of a neutral density filter combined with the one or the other filter.

4. A filter pair for viewing stereograms or conventionally produced colour anaglyph stereograms, the filter pair comprising two filters, a 1-filter and a 2-filter, the filters having spectral characteristics so that:

when a first image is displayed through the 2-filter, the first image being uniformly coloured in the most luminous colour available when using a full set P of primary colours, and the spectral transmission characteristics are measured, a y-value, Lu, calculated according to the 1931 CIE tristimulus colour matching functions, is obtained, the set P being displayable on a display device using additive colour mixing and being partitioned into two disjoint sets I and II, so that P=I+II, while I and II have no common member, when a second image uniformly coloured in the most luminous colour available when using the I-set is displayed through the 2-filter and the spectral transmission characteristics are measured, a y-value, L12, calculated according to the 1931 CIE tristimulus colour matching functions, is obtained, when a third image uniformly coloured in the most luminous colour available when using the II-set is displayed through the 2-filter and the spectral transmission characteristics are measured, a y-value, L22, calculated according to the 1931 CIE tristimulus colour matching functions, is obtained when the second image is displayed through the 1-filter and the spectral transmission characteristics are measured, a y-value, L11, calculated according to the 1931 CIE tristimulus colour matching functions, is obtained, and when the third image is displayed through the 1-filter and the spectral transmission characteristics are measured, a y-value, L21, calculated according to the 1931 CIE tristimulus colour matching functions, is obtained, where L21/L11$\leq$0.05, L21/Lu$\leq$0.01, and L12/L22$\geq$20.005.

5. A coloured filter pair according to claim 4, and fulfilling the requirements of: L21/L11$\leq$0.05, L21/Lu$\leq$0.01 and L12/L22$\geq$0.01.

6. A filter pair according to claim 4, the pair fulfilling the requirements of:

L21/L11$\leq$0.05, L21/Lu$\leq$0.01 and L12/L22$\geq$0.05.

7. A filter pair according to claim 4, further comprising a neutral density filter combined with the 1-filter or the 2-filter.

8. A filter pair according to claim 4, the filter pair having a first filter having, as a nearest hue in the RGB primaries, a blue colour, and a second filter having, as a nearest hue in the CMY primaries, a yellow colour.

9. A filter pair according to claim 4, the filter pair having a first filter having, as a nearest hue in the RGB primaries, a red colour, and a second filter having, as a nearest hue in the CMY primaries, a cyan colour.

10. A filter pair according to claim 4, the filter pair having a first filter having, as a nearest hue in the RGB primaries, a green colour, and a second filter having, as a nearest hue in the CMY primaries, a magenta colour.

11. A filter pair according to claim 4, for generating two partial images for stereoscopic viewing.

12. A filter pair according to claim 11, the filter pair having a first filter having, as a nearest hue in the RGB primaries, a blue colour, and a second filter having, as a nearest hue in the CMY primaries, a yellow colour.

13. A filter pair according to claims 11, the filter pair having a first filter having, as a nearest hue in the RGB primaries, a red colour, and a second filter having, as a nearest hue in the CMY primaries, a cyan colour.

14. A filter pair according to claim 11, the filter pair having a first filter having, as a nearest hue in the RGB primaries, a green colour, and a second filter having, as a nearest hue in the CMY primaries, a magenta colour.

15. A pair of spectacles comprising a filter pair according to claim 4.

16. A lorgnette comprising a filter pair according to claim 4.

17. A viewing frame comprising a pair of filters according to claim 6.

18. An apparatus for recording a stereogram, the apparatus comprising:

a camera having a lens system, an adapter to be mounted on the camera, the adapter comprising two coloured optical filters according to claim 4, means for fusing the partial images after their being filtered through the coloured filters and before their passing through the lens system of the camera.

19. An adapter for use in the apparatus of claim 18.

20. A colour correction method for modification of a stereogram, which is adapted to be viewed through a filter pair according to claim 4, or as identified according to the method of claim 1, the correction comprising the steps of providing a stereogram, uniformly shifting the entire hue circle, identifying at least one hue as (a) fixed hue point(s) and shifting the hue values between the fixed point(s) by varying amounts, a lightness calibration distributed over all colours according to their hue, these modifications being applied on the level of general hues in the image, on the full colour space addressed by the recording device or the storage medium or the display device, on the level of individual picture elements prior to fusion or in the fused image, on the level of individual picture elements in the fused image as compared with original picture element values, on the level of individual picture elements in the fused image compared with homologous point pairs in the two partial images of the stereogram, or on the level of lists of homologically linked picture elements.

21. A method according to claim 20, wherein an even number of hues is identified as fixed hue points.

22. A method according to claim 20, further comprising hue or lightness correction of chosen individual colours or colour ranges.

* * * * *